United States Patent Office 3,459,460
Patented Aug. 5, 1969

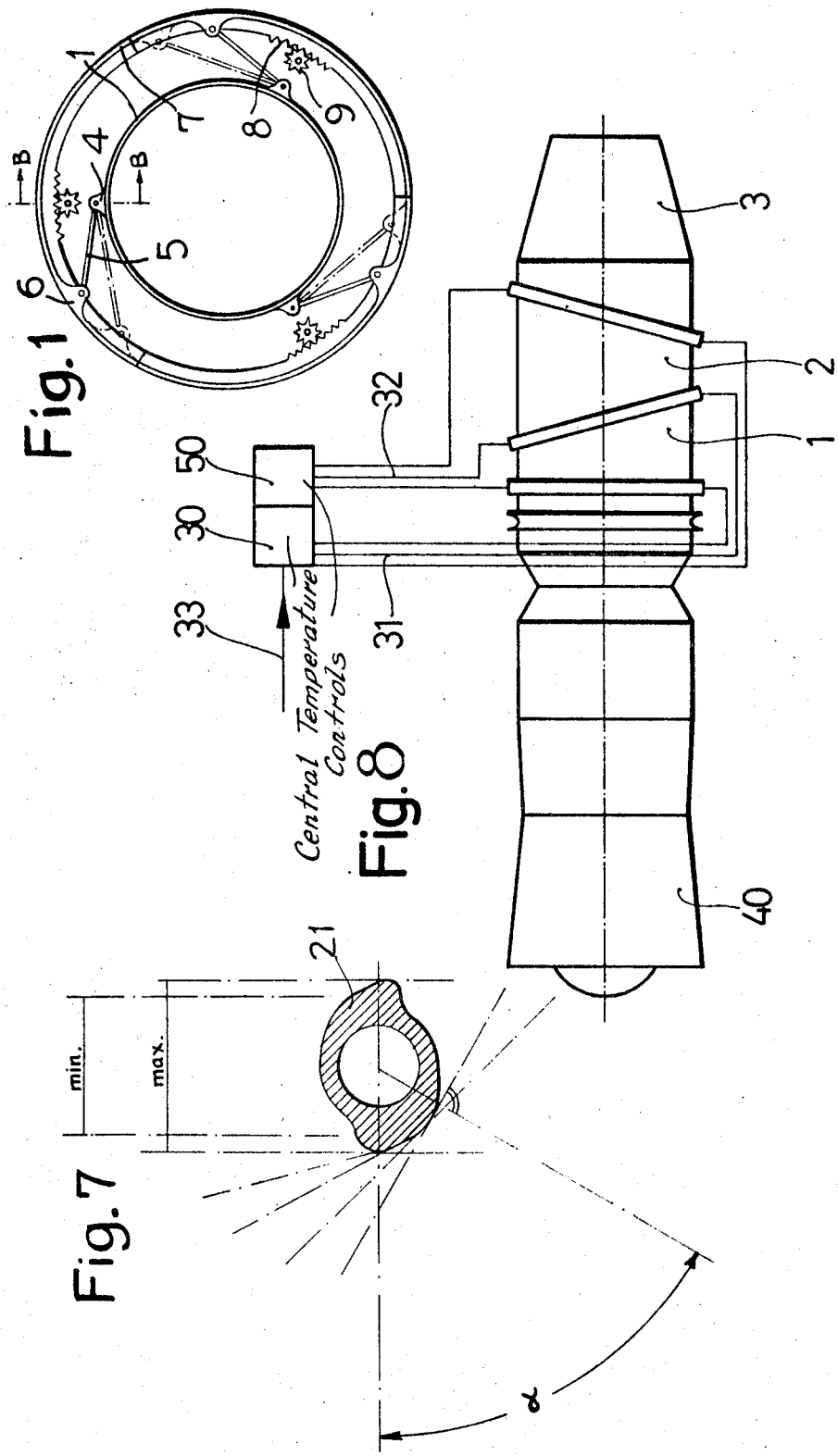

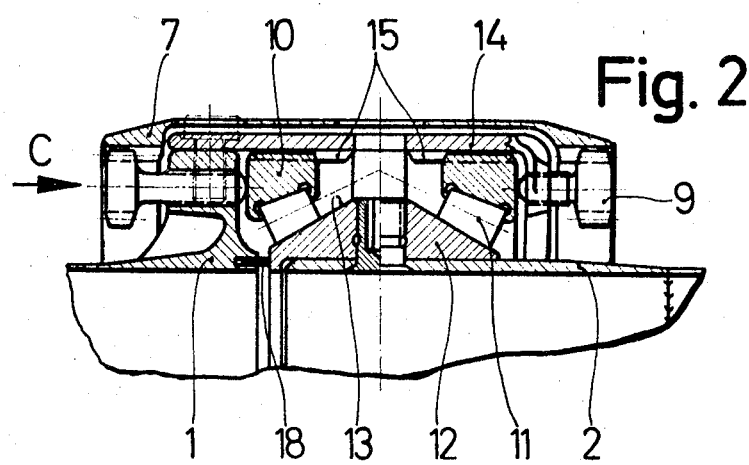

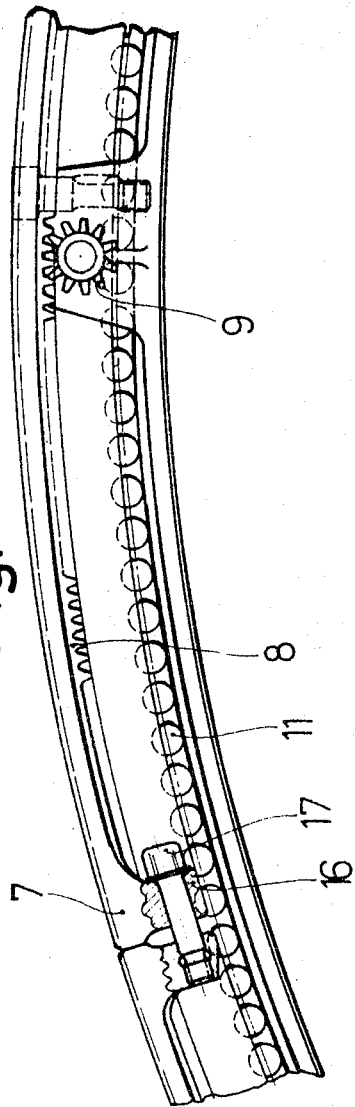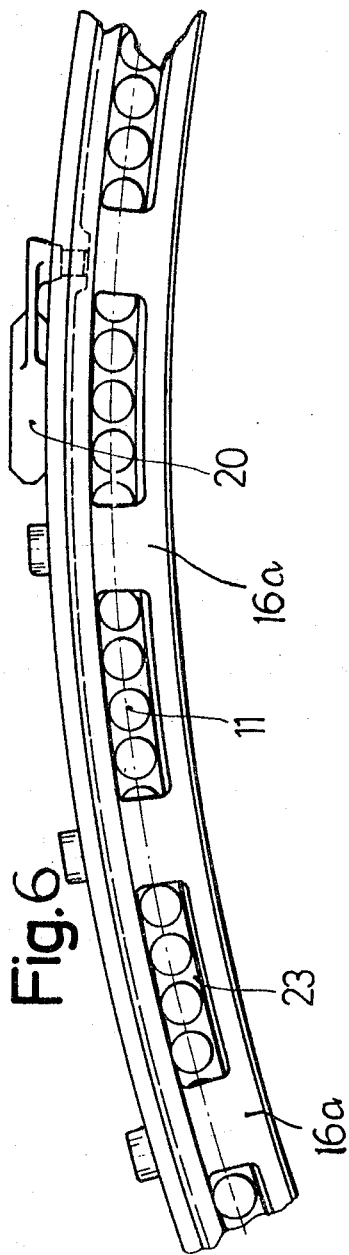

3,459,460
AUTOMATIC HEAT COMPENSATOR FOR
ANTIFRICTION BEARINGS
Gerhard Kopp, Munich, Germany, assignor to Entwicklungsring Sud GmbH, Munich, Germany, a corporation of Germany
Filed May 24, 1967, Ser. No. 640,863
Claims priority, application Germany, June 7, 1966,
E 31,816
Int. Cl. F16c 35/00; F16l 55/00
U.S. Cl. 308—207                    7 Claims

ABSTRACT OF THE DISCLOSURE

An antifriction bearing assembly between tubular segments of a jet deflector which expands and contracts in accordance with temperature by providing a control for adjusting the location of one race of the bearing in response to temperature.

---

Figure 4:
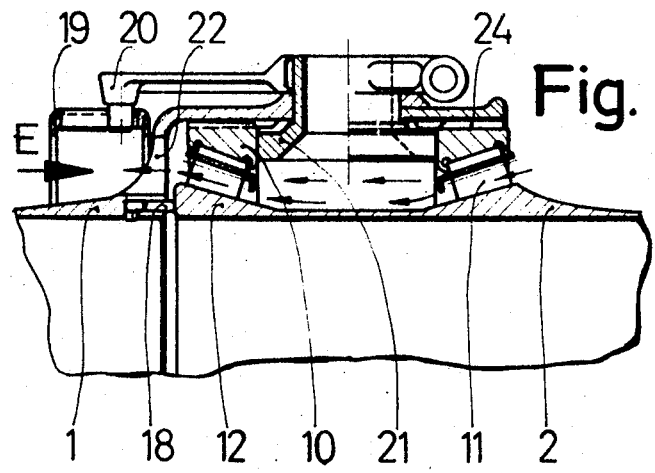

The invention concerns antifriction bearings for tube segments of a jet deflector of jet engines.

In such combinations, the expansion, which is caused by the resulting heat and affects the bearing, was up to now chiefly compensated for by considering the amount of tolerances in accordance with the expansion coefficient of the bearing material. This led to an extreme bearing play when the combination was cold and consequently to considerable noise and increased bearing wear. The large bearing play requires a larger clearance and thus a larger outer surface of the airframe.

In German patent specification 1,066,388 roller bearings have already been suggested in which a compensation for the play by the thermal expansion of a connecting link is caused by the latter directly acting on the inner or outer bearing race. However, in these known configurations, the outer bearing races are moved in axial direction, with no protection against torsion. Furthermore, the adjustment of the bearing play is performed automatically with no intentional control provided. Control, however, is absolutely necessary particularly for a perfect bearing relief.

It is an objective of this invention to eliminate all aforementioned disadvantages in a suitable and advantageous manner.

The objectives are achieved by a linearly expanding bar hinged to each tube segment or a similar body together with a control ring, one or more actuating elements and in some instances another transmission element which together form a drive train for the displacement of the roller bearing race(s) to perform the automatic compensation for the bearing play.

The actuating elements of the drive train of the invention, having relatively coarse tolerances, assure a reliable automatic adjustment of the bearing play.

In a special configuration of the invention the control ring is a gear ring which meshes with corresponding teeth of axial adjustment screws. Furthermore, it is suggested to subdivide the control unit into segments and to assign each segment a body suitable for the linear expansion. These measures assure a smooth, precise and safe adjustment for the purpose of the bearing play compensation. The adjusting forces are multiplied according to the number of segments, while the toothing permits a continuous adjustment.

In a further embodiment of the invention the rotatable control ring moves preferably three or more lever-type actuating elements, which in their turn control eccentrics or similar parts acting upon the inner or outer ring of the antifriction bearing. Thus a simple actuation is generated which acts continuously and may be shifted in axial direction. This embodiment proves to be especially favorable if the elements of the drive train which directly act upon the antifriction bearings are arranged within the cooling air flow of the bearing, so that an additional thermal expansion of the parts transferring forces is prevented.

Another objective of this invention is to provide a bearing of the type described which is rugged and maintenance free.

Figure 5:
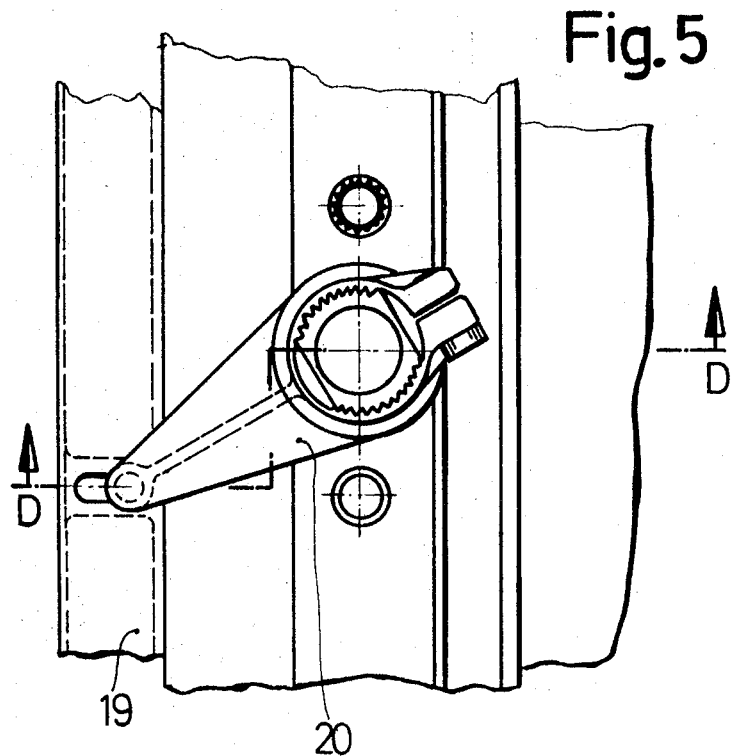

Further details of advantages and special contributions can be seen from the following description and the drawings in which:

FIGURE 1 is a cross section of a jet deflector;
FIGURE 2 is a partial section according to line B—B of FIGURES 1 and 3;
FIGURE 3 is a partial side view in the direction C of FIGURE 2;
FIGURE 4 is a partial section along the line D—D of FIGURE 5 of an embodiment of the invention;
FIGURE 5 is a partial plan view of the configuration according to FIGURE 4;
FIGURE 6 is a partial side view in the direction E of FIGURE 4;
FIGURE 7 is a section of an eccentric; and
FIGURE 8 is a schematic of a central control unit.

The tube segments 1, 2, 3 of a jet deflector of jet engines show butt straps 4, at which bars 5 or similar parts of a material with high expansion coefficients are arranged. These bars 5 engage with butt straps 6 of the control ring 7. The control ring 7 or the control ring segments have teeth 8 which mesh with correspondingly toothed axial adjustment screws 9. The screws 9 have their threaded ends against the outer races 10 of the rollers 11. The inner race 12, which is stationary in the configuration drawn, shows inclined roller running surfaces. The arrangement can also be such that the axial adjustment screws 9 act upon an inner race which can be moved in axial direction and consequently the outer race is stationary. In this case, the inclined roller running surfaces of the outer race must be inclined in the opposite direction. In order to prevent the outer race from rotating, guides 15 engaging with grooves of the outer races 10 are arranged in a bearing cover 14.

The control ring 7 consists preferably of segments having butt straps at their ends, which connect the various segmental pieces by means of screws 17. A gasket 18 prevents loss of pressure between the tube segments.

In the embodiment of FIGURES 4 through 7, the control ring 19 actuates a lever 20 which travels through an angle corresponding to the expansion of the longitudinally variable members 5 and, by this angular movement, twists an eccentric 21 which is designed, e.g. as Archimedean curve. Thus the roller bearing races 10 are shifted in axial direction between a minimum and maximum range, as illustrated in FIGURE 7. Note that the control ring 19 as shown in FIGURE 4 is spaced from the tubular segment 1. This spacing is accomplished by means of cross pieces 16a shown in FIGURE 6. The cross pieces define openings which serve as outlets for cooling air passing between the bearing races and about the bearing elements in the direction of the arrows as shown in FIGURE 4 and out through the annular spaces defined by the cross pieces 16a and the control ring 19.

The arrangement of the invention works as follows: The tube segments 1, 2, 3 of the jet deflector which expand because of the immense heat, cause the bars 5 to expand at the same time. This expansion causes the control ring 7 to rotate. (In FIGURE 1 dash-dotted.) Thus the teeth 8 of the control ring 7 rotate the axial adjustment screws 9, causing a displacement of the outer races 10 of the antifriction bearing. Consequently an automatic compensation for the bearing play as a function of the temperatures prevails. FIGURE 2 shows the location of parts of high temperatures.

When the tube segments 1, 2, 3 cool and consequently the inner bearing races, the bars 5 simultaneously contract to their original length and move the control ring 7. This in turn causes the axial adjustment screws to turn correspondingly. As a consequence, the antifriction bearings are shifted on the slopings 13 of the inner race 12 and the compensation for the play takes place for the cooled bearing.

The same principle applies for the compensation of the play in the embodiment shown in FIGURES 4 through 7. The control ring 19 is also moved by longitudinally variable bars 5, thus twisting a lever 20 which is in operating connection with the control ring 19. This lever 20 actuates an eccentric 21—preferably an Archimedean screw—which acts straddlingly upon the outer races 10 of the rollers 11. Thus the race(s) is (are) shifted in accordance with the bearing play caused by the thermal expansion. The eccentric can also act upon the inner races of the antifricton bearing if the total design is modified correspondingly.

If the control ring 7 is centrally controlled by a temperature control device, as provided in one configuration, the longitudinally variable elements 5 of the drive train described before are eliminated. Their place is taken by a control unit 30, 50 which controls the compensation for the bearing play by means of a servo force via the other elements of the drive chain of the invention. Those skilled in the art are capable of making such a substitution.

What is claimed is:

1. An antifriction bearing assembly for use in jet engine deflectors comprising
   tube segments in adjacent end-to-end relationship,
   a control ring rotatably mounted about the line of adjacency of said tube segments,
   a first bearing race mounted on one of said tube segments,
   a second bearing race spaced from said first race in opposed relationship,
   a plurality of roller bearings between said races,
   temperature responsive expansion means between one of said tube segments and said control ring for rotating said ring upon expansion of said means,
   a threaded member engaging one of said races, and
   means connecting said control ring and said threaded member for rotating said member, and moving one of said races axially of said segments when said ring is rotated by the expansion of said temperature responsive expansion means.

2. An antifriction bearing assembly for use in jet engine deflectors comprising tube segments in adjacent end-to end relationship,
   a control ring about the line of adjacency of said tube segments,
   a first bearing race mounted on one of said tube segments,
   a second bearing race spaced from said first race in opposed relationship,
   a plurality of roller bearings between said races,
   temperature responsive expansion means between one of said tube segments and said control ring for rotating said ring upon expansion,
   a rotatable lever having one end in engagement with one of said bearing races, and
   means connecting said control ring and the other end of said lever for rotating said lever and moving said one of said races axially of said segments when said ring is rotated by the expansion of said temperature responsive expansion means.

3. The bearing according to claim 2 wherein said lever in engagement with one of said races includes an eccentric at said one end engaging said one of said races.

4. The bearing of claim 1 wherein said connecting means between said threaded member and said ring comprises gear teeth on the inner surface of said ring and mating gear teeth on one end of said threaded member.

5. Bearings according to claim 1 characterized by the fact that said ring is spaced from said tubular segments by crosspieces so that the resulting annular space is used as cooling air outlets.

6. Bearings according to claim 2 characterized by the fact that said ring is spaced from said tubular segments by crosspieces so that the resulting annular space is used as cooling air outlets.

7. An antifriction bearing assembly for use in jet engine deflectors comprising tube segments in adjacent end-to-end relationship,
   a control ring rotatably mounted about the line of adjacency of said tube segments, a first bearing race mounted on one of said tube segments, a second bearing race spaced from said first race in opposed relationship, a plurality of roller bearings between said races, means for rotating said control ring in response to changes in temperature, means operably connecting said control ring and one of said bearing races whereby rotation of said control ring in response to temperature change causes movement of said one bearing races axially of said tube segments and relative to said other bearing surface.

References Cited

UNITED STATES PATENTS

| | | | |
|---|---|---|---|
| 1,982,265 | 11/1934 | Nenninger. | |
| 2,173,561 | 9/1939 | Olson | 308—189 |
| 3,106,432 | 10/1963 | Opferkuch | 308—70 XR |
| 3,313,581 | 4/1967 | Kusakabe | 308—189 |
| 3,341,229 | 9/1967 | De Wilde | 60—232 XR |

CARLTON R. CROYLE, Primary Examiner

U.S. Cl. X.R.

60—39, 232; 239—265; 285—187